United States Patent
Windemuller et al.

[11] Patent Number: 5,113,644
[45] Date of Patent: May 19, 1992

[54] BLUEBERRY PICKING MACHINE

[76] Inventors: Donald Windemuller, 15410 Greenly St., Holland, Mich. 49424; Wayne A. Vogel, 1291 Maple Island Rd., Fremont, both of Mich. 49412

[21] Appl. No.: 738,215

[22] Filed: Jul. 30, 1991

[51] Int. Cl.$^5$ ........................................... A01D 46/26
[52] U.S. Cl. ................................... 56/330; 56/12.8; 56/340.1; 56/DIG. 2; 56/DIG. 8
[58] Field of Search .................. 56/330, 12.8, 14.3, 56/328.1, 340.1, 329, DIG. 2, DIG. 8

[56] References Cited

U.S. PATENT DOCUMENTS

| | | | |
|---|---|---|---|
| 2,660,021 | 11/1953 | McDowell | 56/330 |
| 3,184,908 | 5/1965 | Rust | 56/330 |
| 3,255,578 | 6/1966 | Pertics | 56/330 |
| 3,325,984 | 6/1967 | Christie et al. | 56/330 |
| 3,344,591 | 10/1967 | Christie et al. | 56/330 |
| 3,385,042 | 5/1968 | Christie et al. | 56/330 |
| 3,494,117 | 2/1970 | Weygandt et al. | 56/330 |
| 3,590,566 | 7/1971 | Cutts, Sr. | 56/330 |
| 3,601,964 | 8/1971 | Fisher | 56/330 |
| 3,720,050 | 3/1973 | Rozinska | 56/330 |
| 3,772,866 | 11/1973 | Sell | 56/330 |
| 3,827,222 | 8/1974 | Toti | 56/330 |
| 3,872,655 | 3/1975 | Davis, Sr. | 56/27.5 |
| 3,959,959 | 6/1976 | Louault et al. | 56/330 |
| 4,114,463 | 9/1978 | Garden et al. | 74/61 |
| 4,150,526 | 4/1979 | Burton | 56/329 |
| 4,173,859 | 11/1979 | Goldsmith et al. | 56/330 |
| 4,179,873 | 12/1979 | Scudder | 56/330 |
| 4,186,547 | 2/1980 | James | 56/330 |
| 4,241,569 | 12/1980 | Bobard et al. | 56/330 |
| 4,282,706 | 8/1981 | Orlando | 56/330 |
| 4,283,906 | 8/1981 | Scudder | 56/330 |
| 4,286,426 | 9/1981 | Orlando et al. | 56/330 |
| 4,292,792 | 10/1981 | Burton | 56/330 |
| 4,303,373 | 12/1981 | Polhemus | 415/206 |
| 4,418,521 | 12/1983 | Orlando et al. | 56/330 |
| 4,430,849 | 2/1984 | Wilson et al. | 56/12.8 |
| 4,750,322 | 6/1988 | Korthuis | 56/328.1 |
| 4,860,529 | 8/1989 | Peterson et al. | 56/330 |
| 4,972,662 | 11/1990 | Korthuis et al. | 56/10.2 |
| 4,974,404 | 12/1990 | Korthuis et al. | 56/330 |
| 4,982,558 | 1/1991 | Korthuis | 56/12.6 |
| 5,010,719 | 4/1991 | Korthuis | 56/10.2 |
| 5,027,593 | 7/1991 | Korthuis | 56/328.1 |

FOREIGN PATENT DOCUMENTS

| | | |
|---|---|---|
| 2421546 | 11/1979 | France. |
| 245239 | 10/1980 | France. |
| 1227129 | 4/1986 | U.S.S.R. . |

Primary Examiner—Terry L. Melius
Attorney, Agent, or Firm—Price, Heneveld, Cooper, DeWitt & Litton

[57] ABSTRACT

A blueberry picking machine having a supporting frame from which two brush-like bush contacting members depend. The brush-like bush contacting members rotate freely when they contact a bush. Each bush contacting member is reciprocated vertically by an end driver unit containing counter-rotating weights rotating in a vertical plane to enable each brush-like member to dislodge ripened fruit from each branch contacted. The ripened fruit falls onto a plurality of movable catcher pans from which the fruit can travel to a continuous conveyor belt on each side which carry the fruit to the rear of the machine. A source of air supplies a large volume of air under the catcher pans and also blows air through the conveyor belts to clean the picked fruit. Secondary air sources are provided for blowing additional air through the conveyor belts to further clean the picked fruit.

34 Claims, 4 Drawing Sheets

BLUEBERRY PICKING MACHINE

BACKGROUND OF THE INVENTION

The use of straddle-type blueberry picking machines is well known today. These machines employ a substantially U-shaped elevated ground contacting frame which is usually self-propelled. The fruit bearing bushes are usually planted in spaced rows. The machine then straddles each row with the blueberry bushes passing through a longitudinal opening in the center of the machine. In order to dislodge the ripened berries from the branches of the bush, arms have been used which project out from each side into the longitudinal opening to agitate the bushes as the machine moves along the row. Others have suggested the use of freely rotating spaced drums with fingers projecting from the outer surface which roll along the bush at the same speed as the harvesting machine passes over the ground. The drums are biased inwardly to force the drums into contact with the surface of the bushes. Fingers projecting from the drums comb the surface of the bushes and knock the ripened berries off the branches.

In this description, blueberries and blueberry bushes will be used as a representative crop bearing bush. The invention, however, is not so limited. The term "blueberry" is used as a generic expression for all types of berries, fruits, beans, nuts, vegetables, and the like, which grow on bushes, trees and vines and which can be harvested mechanically by a machine passing over the crop bearing plant.

In order to improve the harvesting with straddle-type harvest machines employing freely rotating shakers or brush-like members, means have been used to cause the shakers to vibrate or twist as they roll along the bushes. For example, Rust U.S. Pat. No. 3,184,908 has a pair of laterally and longitudinally spaced, vertically oriented shakers fixed to a ground contacting frame. A pair of spaced crankshafts connected by an endless chain extend across the top of the frame. Each shaker is rotatably connected to 180° opposed cranks on the crankshafts. The crankshafts are driven by a power take off from a tractor which causes the shakers to move up and down as the shakers roll along in contact with the fruit bearing plants. When using this type of assembly, the drive mechanism for the shakers can be loaded down when the rods or fingers on each shaker enter into a bush with heavy vegetation. Also, the shaker assembly is directly attached to the frame which can cause substantial vibration of the frame during operation of the picker.

Christie et al. U.S. Pat. Nos. 3,325,984 and 3,385,042 disclose a straddle-type picker having a pair of freely rotatable drums which support a plurality of projecting bush contacting and penetrating fingers. Each of the drums is freely rotatable and moves along the row of bushes at the same rate that the frame of the machine passes over the ground. Each of the shakers has its own vibrating unit which rotates an eccentric connected to the central shaft of the drum. Both the frequency and amplitude of the motion of the shakers is manually adjustable by changing the position of mechanical linkages. Again, as in the previously described picker, the picking action can be erratic, depending upon the density of the vegetation in the bush. Also, drum-type pickers have a tendency to roll along the surface of the bush combing the branches stripping all of the berries and scraping the branches, damaging the plants.

Weygandt et al. U.S. Pat. No. 3,494,117 discloses a straddle-type picker having a pair of spaced drums supporting a plurality of fingers for contacting and dislodging the fruit from the bushes. The drums of Weygandt et al. are supported either on heavy coil springs or by spring arms. The drums are caused to vibrate through the use of rotating weights mounted within the drums. As the weights rotate simultaneously in the same direction, the drums move in an orbital manner. The orbital movement can cause thin branches to wrap around the fingers resulting in damage to the bushes.

In each of the aforementioned references, the entire shaker assemblies can be made to move laterally relative to the plants being harvested. In Rust, the shakers are manually movable while in Christie et al., the shakers are spring biased to extend toward the longitudinal centerline of the machine. In Weygandt et al. the shakers are mounted on powered movable arms. In each of the referenced systems, the shaker or picker has a tendency to comb the outer surface of each bush.

It is extremely important in harvesting blueberries that the proper amount of energy be applied to each bush so that only the ripened fruit is collected, leaving the green or not yet fully ripened fruit for picking at another time. It is also important that the bushes be protected from damage during the harvesting process. In the past, the rows of blueberry bushes being harvested were slapped by flailing arms or radically oscillating shaker drums which produced a complex series of motions in the hope of striking all of the berry bearing branches to pick the fruit. The erratic oscillations of the pickers caused not only unripe berries to be picked but also the bushes themselves to be damaged.

SUMMARY OF THE INVENTION

In accordance with the present invention, a straddle-type blueberry harvesting machine is disclosed which employs a pair of spaced shakers, each of which has its own independent source of vertical vibratory energy. The amount of energy applied to each of the shakers can be precisely controlled and is not dependent on or affected by the load placed upon the shaker. Regardless of the load placed upon each shaker, the same amount of energy is applied to each unit. As a shaker breaks free of heavy vegetation, it does not tend to race. It merely returns to its normal picking mode.

Each of the shakers is freely rotatable and will roll along a row of bushes at the same rate as the ground is traversed by the supporting frame. The fingers on the shakers are constrained to undergo a simple up and down motion which limits the tendency for branches to wrap about the fingers. In one embodiment of the present invention, the shakers are resiliently mounted on a separate pivotally mounted subframe which is supported by the main frame of the harvesting machine. The subframe is mounted above the longitudinal passage through which the bushes pass as the harvester straddles a row of bushes. The subframe supporting the shakers can be moved up and down to enable the rolling vibrating shakers to move up and down from branch to branch through a bush being harvested to gently dislodge the ripened berries from the bush. In another and more preferred embodiment, the shakers are resiliently attached to the main frame. In both embodiments of the harvesting machine, the lateral positions of the shakers are fixed. Each shaker has a plurality of spaced elongated picking fingers which penetrate deeply into each bush as the shakers freely rotate The picked fruit falls onto a plurality of movable catcher pans which form a substantially continuous floor under each bush as it moves through the machine, the catcher pans being movable by the bush.

A large volume of air is supplied under the catcher pans to deflect fruit which might fall through the opening. The picked fruit moves from the catcher pans onto a conveyor belt on each side of the machine. The conveyor belts have apertures therein and some of the air which blows under the catcher pans is directed through the apertures to clean the picked fruit. A secondary air supply on each side of the frame provides additional air to thoroughly clean the fruit to prepare it for washing and packaging without the need for additional cleaning.

DETAILED DESCRIPTION OF THE DRAWINGS

DETAILED DESCRIPTION OF THE PREFERRED EMBODIMENTS

Figure 1:
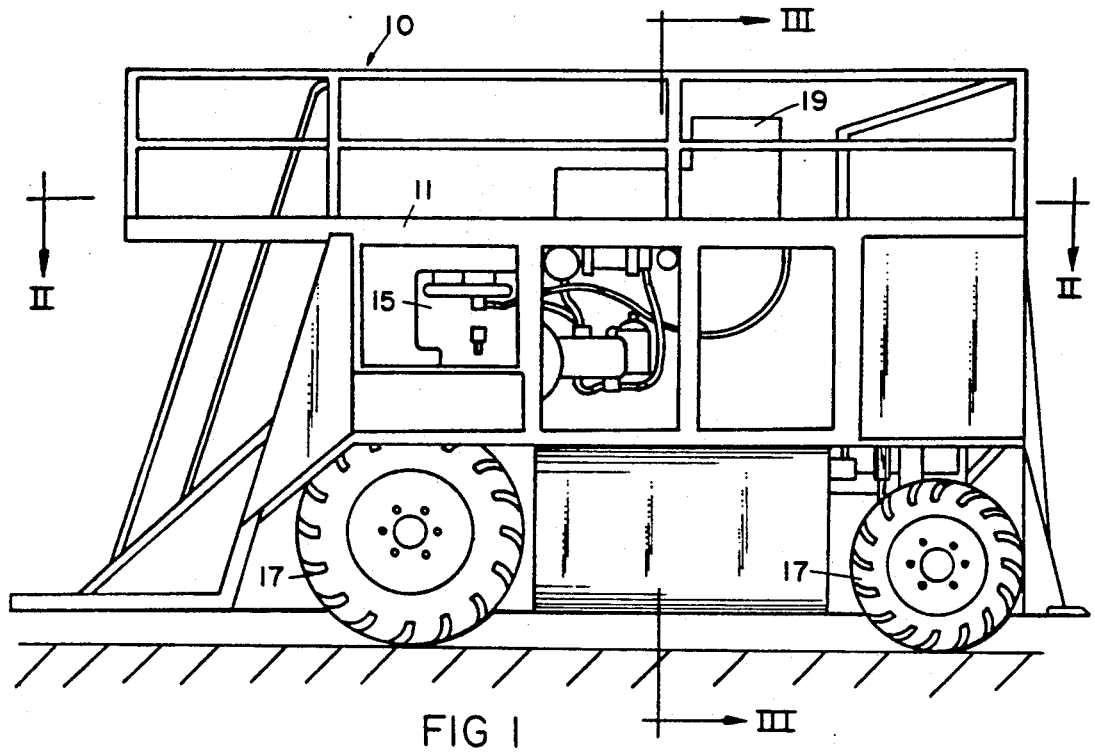
FIG. 1 is a side elevational view of the blueberry harvesting machine.
Figure 2:
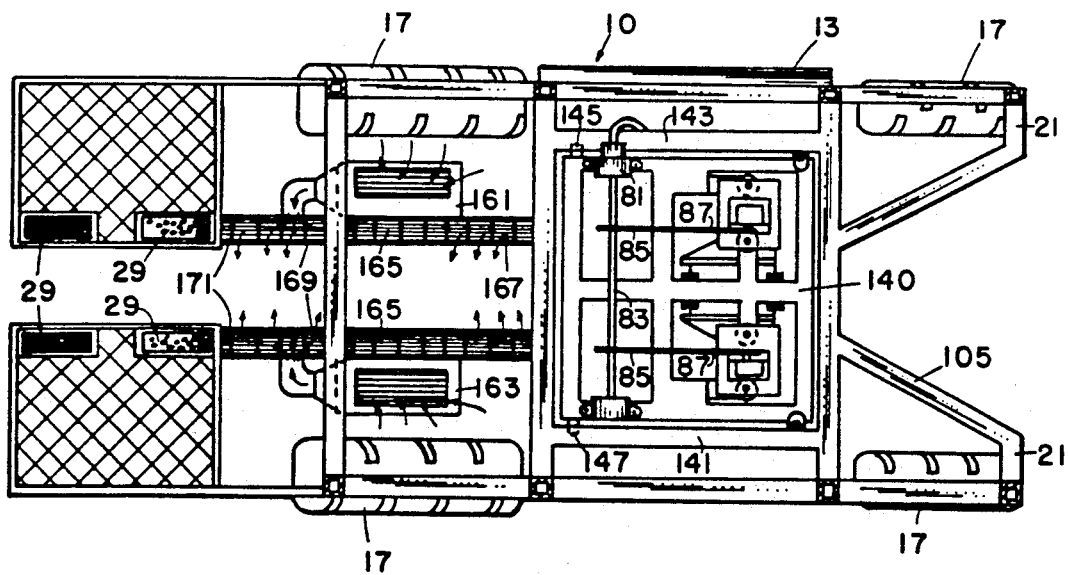
FIG. 2 is a top plan view along the line II—II of FIG. 1, with the shaker assemblies removed so that the cleaning air blowers and conveyor belts can be seen.

Referring to FIGS. 1 and 2, the harvesting machine of the present invention is indicated generally by the number 10. The harvesting machine has an inverted U-shaped frame configuration having a left side 11 and a right side 13. The harvesting machine is a self-propelled motor vehicle having an engine 15 (FIG. 1) and four ground contacting wheels 17. The harvesting machine is controlled from a raised position 19 from which the operator can view the row of bushes and the individual bushes as they enter the machine. The inner and outer surfaces of the machine are covered with a smooth material, preferably sheet metal, to enable the machine to pass over a row of bushes being harvested and along adjacent rows without damaging the bushes. The leading edge portion 21 of each side of the machine is covered during operation to protect adjacent bushes and also to help direct extending branches of the bushes being harvested into the center portion of the machine.

Figure 3:
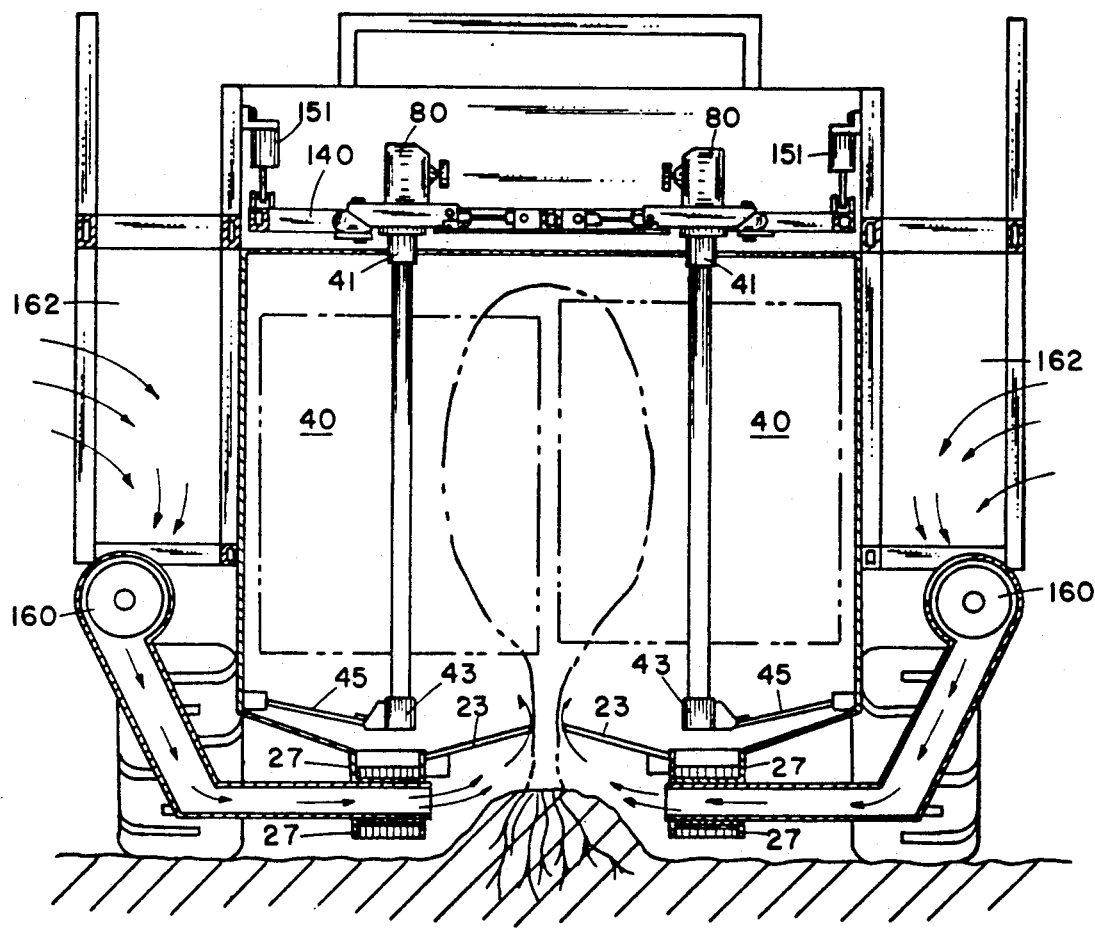
FIG. 3 is a sectional view of the blueberry harvesting machine taken on the line III—III of FIG. 1, showing the location of the shaker assemblies, the blowers used in harvesting the blueberries, the catcher pans and the endless conveyor belts used to deliver harvested berries to containers at the rear of the machine.

As shown in FIG. 3, the bottom portion of the center of the harvesting machine is substantially closed by a plurality of pivotally mounted catcher pans 23. The catcher pans are supported by the frame of the harvesting machine at an inclined angle so that any fruit or berries falling on a pan will tend to roll downwardly and outwardly to the conveyor belts 27 where the fruit is transported to the rear of the machine where it is dropped into containers 29 (FIG. 2) supported on the shelf 31 which projects from each side of the rear of the harvesting machine.

Figure 7:
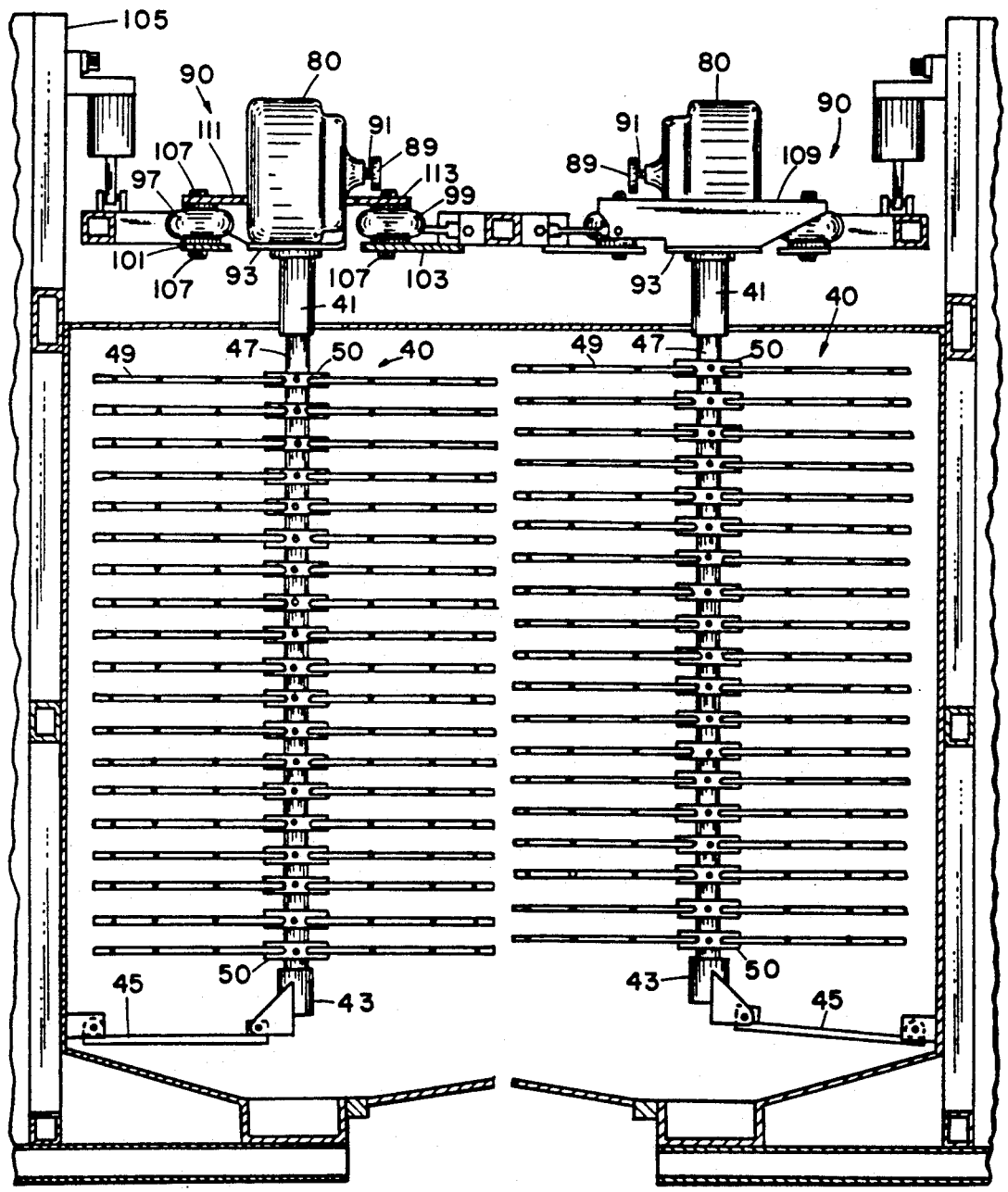
FIG. 7 is a fragmentary view showing the resilient supports for each shaker and associated driver on an embodiment of the harvesting machine employing a movable subframe.

In FIGS. 3 and 7, a pair of shakers, indicated by the number 40, are shown mounted on each side of the longitudinal centerline of the harvesting machine. Each shaker is supported in a collar 41. The bottom of each shaker has a collar 43 which is pivotally attached by struts 45 to the frame of the harvesting machine. This mounting at the top and bottom of each shaker 40 helps to limit the motion of the shaker to a simple vertical up and down movement. The absence of complex shaker movements tends to limit injury to the bushes.

Shaft 47 of each shaker assembly has a plurality of substantially rigid fingers or rods 49 projecting outwardly in a circular pattern about the central shaft. Rods 49 are supported by spaced hubs 50 attached to shaft 47. Hubs 50 can be attached to shaft 47 by any type of conventional fastener or by welding. Welding is preferred due to its simplicity and durability. Each shaker has an overall diameter of approximately 41 inches and is approximately 5 feet long with 18-20 sets of fingers spaced approximately three inches along the length of each shaft 47. Each shaker assembly is substantially lighter than the drum-type shakers previously used.

The shaker assemblies 40 (FIG. 8) are mounted in supports 41 and 43 so that the units can freely rotate as the row straddling harvesting machine passes over a row of blueberry bushes and the bushes pass between the shaker elements. The shakers will rotate at the same speed as the harvesting machine traverses the ground.

Figure 6:
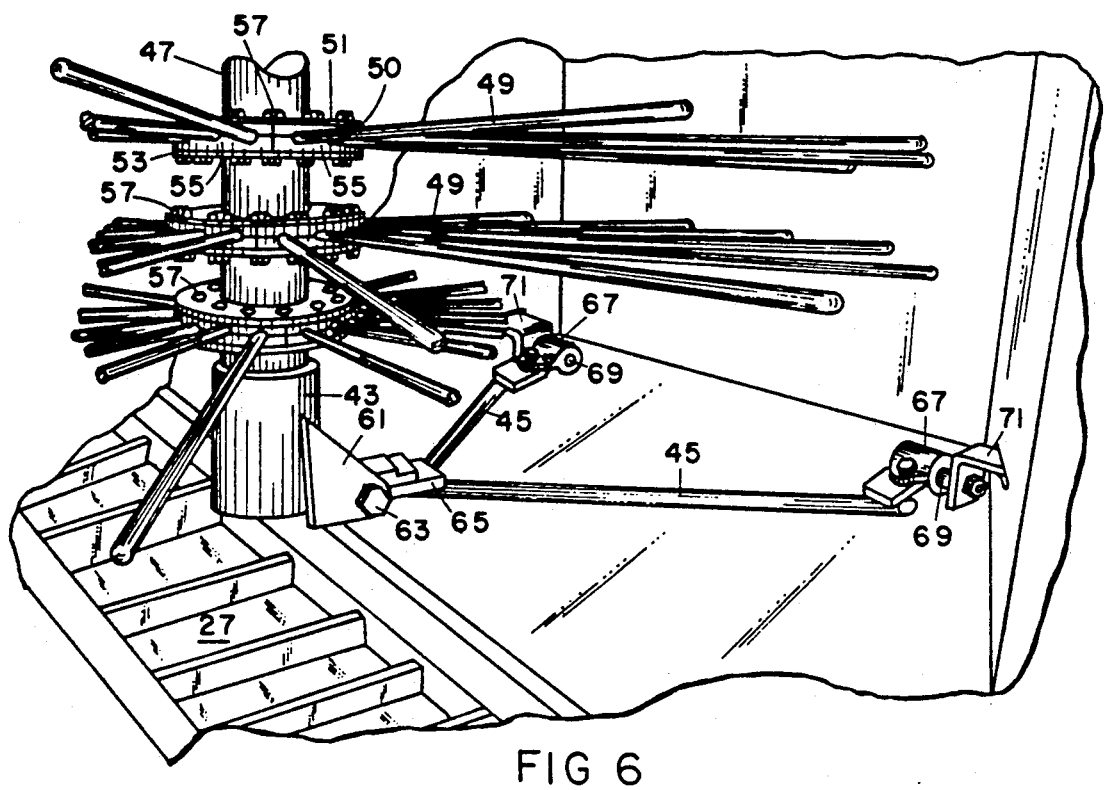
FIG. 6 is a fragmented view of the bottom end of a shaker assembly showing the struts used to hold the shaker assembly in position.

Referring to FIG. 6, the bottom portion of a shaker assembly 40 is shown. The collars 50, which support picking fingers 49, are made up of an upper collar 51 and a lower collar 53, each of which is preferably welded to center shaft 47. Between each of the upper and lower collars are mounted four sectors 55, each of which contain radially spaced grooves. When the sectors are stacked between the collars, the grooves align to provide a plurality of radially spaced sockets for receiving the ends of the rods 49. The collars 51 and 53 can be tightened by spaced nut and bolt fasteners 57 to compress the sectors onto the rods 49 to tightly hold the rods in place.

Each of the rods 49 is preferably made of fiberglass and is approximately twenty inches long and approximately one-half inch in diameter. In order to protect the bushes and berries from damage, the free end of each rod is slightly rounded to enable the rod to penetrate deeply into a bush without damage.

As previously discussed, shaft 47 of each shaker assembly is caused to move in a simple vertical up and down motion. In order to control and constrain the bottom of shaft 47, a sleeve 43 is mounted on the bottom of the shaft. Sleeve 43 contains a bearing assembly (not shown) to enable the shaker unit to freely rotate. A pair of spaced flanges 61, only one of which is shown, are welded to sleeve 43. A bolt and nut combination 63 provide a pivot point for a link 65 which is fastened to a pair of diverging struts 45. The remote ends of struts 45 are attached to pivotable links 67. The pivotable links are fastened to pivot pins 69. The pins 69 are attached to flanges 71 which are fastened to the frame of the harvesting machine. Sleeve 43 is free to move up and down in a vertical direction while erratic movements are prevented by pivotally mounted struts 45.

Each shaker 40 has a driver unit 80 which causes the shaker assembly to reciprocate vertically. Each driver unit 80 is an Ajax vibrating shaker drive which is manufactured by Renold Inc., Westfield, N.Y. Each driver unit contains a pair of counter-rotating weights. Driver units utilize the forces set up by rotating two weights in opposite directions. The two weights are mounted on shafts geared together and supported by anti-friction bearings in a totally enclosed housing. The centrifugal forces of the counter rotating weights combine at two points to produce a directional force. These points are where the weights are passing on the axis which is vertical (or perpendicular) to the foot mounting pad. When the driver is attached to a freely supported member, the forces generated will produce an amplitude of vibration at the running frequency. The weights in the driver unit are rotating in phase but in opposite directions so that the force applied when the weights pass at the top and bottom is delivered to the end of shaker assembly 40 in the form of a reciprocating motion.

A hydraulic motor 81 (FIG. 2) drives a shaft 83 upon which a pair of spaced pulleys 85 are mounted. Rubber drive belts 87 extend from each pulley 85 to a pulley 89 (FIG. 7) fixed to the drive shaft 91 of each driver unit 80. The rubber belts used can be simple V-belts with appropriately shaped pulleys or rubber timing belts having spaced teeth in cooperation with cogged pulleys. The operator of the harvesting machine can control the speed of hydraulic motor 81 and in turn the speed of rotation of driver units 80. The two driver units 80 can be operated either in phase with each other or out of phase with one shaker assembly 40 ascending while the adjacent shaker unit is descending.

Figure 5:
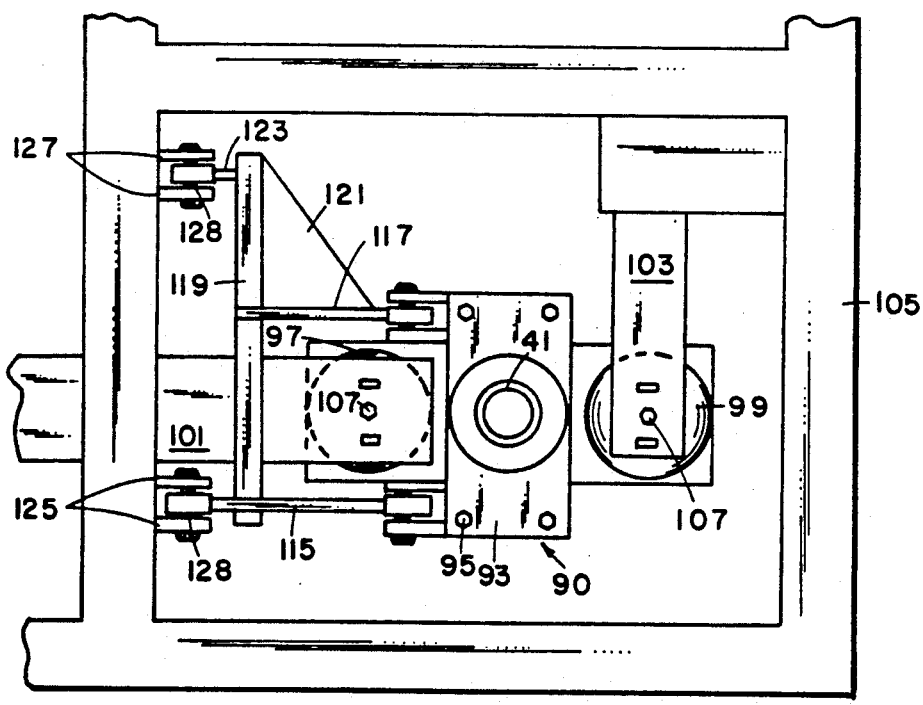
FIG. 5 is an overhead view of the components used to resiliently attach a shaker assembly to a fixed frame.

Drive unit 80 is supported directly above each shaker unit 40 on a driver unit support platform 90. The drive unit 80 is on a platform 93 to which it is bolted by spaced bolts 95, referring to FIGS. 5 and 7. A pair of air bags 97 and 99 are supported on steel plates 101 and 103 which are welded to frame 105. Bolts 107 are used to hold the air bags in place on their respective supports. A side frame member 109 (FIG. 7) is connected between plate 93 and two plates 111 and 113. Plates 111 and 113 extend across the drive unit 80 to a second plate 109 (not shown) which is joined to the opposite end of plate 93. For clarity in FIG. 7, plate 109 is not shown on the left platform so that the air bags and their mountings can be seen. Air bag 97 is positioned between support plate 101 and cross plate 111 and is held in position by bolts 107. Air bag 99 is supported on plate 103 and is held below cross plate 113 by bolts 107. Air bags 97 and 99 are connected to a source of high pressure air so that the operator of the harvesting machine can inflate the bags to adjust the position of the shaker assemblies.

As indicated above, driver units 80 employ a pair of counter-rotating weights (not shown) which cause shaker assembly 40 to undergo vertical reciprocating motion. In order to preclude a twisting action being imposed on the shakers as the weights move outwardly in opposite directions, a pair of struts 115 and 117 are connected to the driver unit support platform 90. Struts 115 and 117 are fastened together by a brace 119 which spaces the attachment points of the two struts to frame 105. Struts 115 and 117 are preferably welded to brace 119 which is a length of two inch diameter steel tubing. A gusset plate 121 is fastened between strut 117 and brace 119 to resist the tendency for the shaker units 40 to be pushed backward as the harvesting machine advances over a row of bushes. The gusset plate could also be attached to strut 115 to provide a pulling force to resist movement of the shaker assembly. Likewise, two gusset plates can be used, if necessary, depending on the type of plants being harvested.

Strut 115 and attachment member 123 are each pivotally attached by fasteners 128, such as a combination of a bolt and nut, to a pair of spaced flanges 125 and 127 which are attached to fame 105. In order to reduce the amount of vibration transmitted to the frame, the end of strut 115 and attachment member 123 contain rubber blocks (not shown) through which fasteners 128 can pass. The second shaker assembly 40 is attached to frame 105 in substantially the same way using the mirror image of the connections.

In the preferred embodiment, driver units 80 and associated shaker assemblies are resiliently mounted directly on frame 105 of the harvesting machine. The operator of the machine can directly control the speed of rotation of the driver units and in turn the output power to move the shaker assemblies up and down sufficiently to harvest the blueberries.

In a second embodiment of the harvesting machine, the driver units and shaker assemblies are similarly attached to a subframe which is pivotally mounted in the center of the harvesting machine.

The subframe can be moved up and down by the machine operator to extend the area covered by the shaker assembly. Again, the operator can control the energy applied to the shaker assemblies and can, for example, use a very small amount of energy and gently move the shaker through an extended range. The operator can also apply a large amount of energy to the shaker assemblies and only move the subframe as the operator determines, depending on the particular harvesting conditions encountered.

Figure 4:
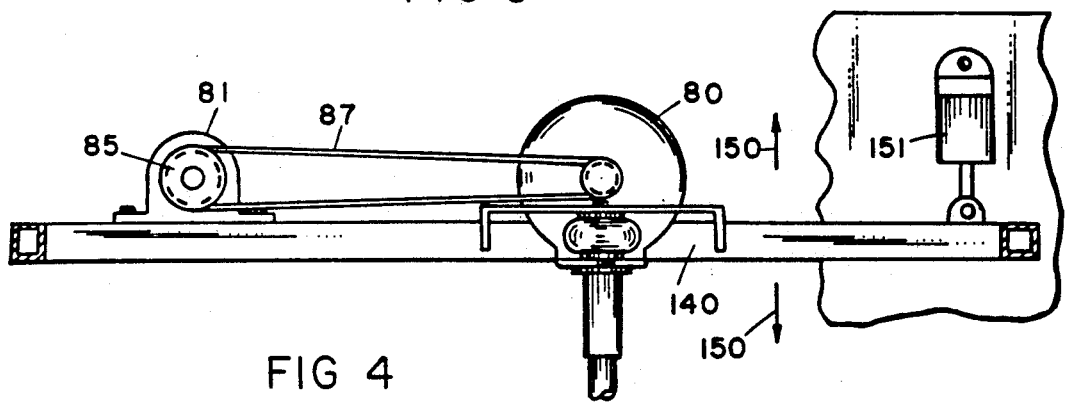
FIG. 4 is an elevational schematic view showing the subframe used to support the shaker assemblies on the main frame.

Now referring to FIGS. 2 and 4, subframe 140, shaker assemblies 40 and driver units 80 can be seen mounted above the center portion of the harvesting machine. The frame of the harvesting machine is indicated generally by the number 105. Subframe 140 is pivotally mounted to longitudinal frame members 141 and 143 by a pair of pivot pins 145 and 147. As can best be seen in FIG. 4, subframe 140 can be moved upwardly and downwardly, as shown by arrow 150, by double acting hydraulic cylinders 151.

The frequency of the vibration of shaker units 40 can be determined by controlling the speed at which the motor 81 causes the counterweight driver units 80 to rotate. The driver units can cause the shaker assemblies to move up and down from approximately one to one and one-half inches, with the preferred range approximately three-quarters of an inch to one inch. Subframe 140 can raise approximately three inches so that the combination of the vibration and the movement of subframe 140 will enable picker fingers 49 to move gently as a unit up and down and from branch to branch of a bush to harvest the ripe berries. The driver of the harvesting machine can control the speed of movement of the machine across the ground, the frequency of the vibration applied to shaker assemblies 40, and the amplitude of the movement of subframe 140 relative to main frame 105. The driver can also adjust the overall height of frame 105 using conventional hydraulic cylinders (not shown). The driver, after a preliminary adjustment of the height of the frame, can then make a fine adjustment of the height of shaker assemblies 40 and fingers 49 by adjusting the air pressure applied to air bags 97 and 99 supporting the shaker units.

As best seen in FIG. 3, a blower assembly 160 is mounted in each side of the harvesting machine and directs its output air below catcher pans 23. The use of an air blower in the harvesting of blueberries is disclosed in U.S. Pat. application Ser. No. 07/605,580 filed Oct. 30, 1990, entitled BLUEBERRY HARVESTING MACHINE. The patent application was filed in the name of Donald Windemuller, a co-inventor of the present invention, and is incorporated herein by reference. In the preferred embodiment, the air is directed through the center of endless conveyor belt 27 in order to raise the bottom of the harvesting machine. The air can also be directed below the conveyor belt; however, this lowers the bottom of the machine and raises the possible incidence of ground contact and possible root damage to the bushes being harvested. The input air for the blower 160 is preferably brought into the sides of the machine through screened openings 162. Each blower assembly 160 is approximately four feet in length and sixteen inches in diameter and has a plurality of spaced, slightly concave, air moving veins for moving the air. The fans are preferably of the cross-throw type similar to fans used in wheat harvesting combines. While the cross-throw fan is preferred, the invention is not so limited. Other types of fans such as centrifugal and separate blades mounted on a hub can be used. Also, the fans can either push or pull the air.

Each fan 160 is preferably driven by a conventional hydraulic motor attached directly to the rotor. The fans can also be indirectly driven using rubber drive belts connected to remotely positioned hydraulic motors. By using direct drive for each blower on the harvesting machine, several sources of potential mechanical failure are eliminated, increasing the reliability of the blower assemblies.

In the operation of the harvesting machine, the driver approaches a row of blueberry bushes to be harvested and makes the initial height adjustment of the frame and any fine tuning necessary with the pressure applied to the air bags. The driver then activates the shaker units and blowers 160 and advances the harvesting machine to straddle the row of blueberry bushes. As the blueberry bushes enter the harvesting machine, the driver from his position above the row, can look down to see the action of the shaker fingers on the bushes and determine whether the frequency of the vibration should be increased or decreased and whether subframe 140 should be raised or lowered, if an embodiment of the harvesting machine with a subframe is being used, to enable the shaker assemblies to completely contact all of the fruit bearing branches of the bushes being straddled. As the shaker units dislodge the fruit, the fruit falls to the inclined floor formed by the pivotally mounted catcher pans and rolls to the side onto the conveyor belts. As the machine progresses, each blueberry bush opens an area of the catcher pans through which blueberries might fall and be lost on the ground. In order to prevent this loss, the fountain of air from blowers 160 flows upwardly through the opening in the catcher pans causing any blueberries which might tend to drop straight to the ground to be deflected to one side or the other of the harvesting machine. The asymmetric shape of the blueberry encourages this unstable flight. The combination of the motion of shaker assemblies 40 and the air blast from blowers 160 enables the harvesting machine to pick substantially all of the ripe berries from the blueberry bush without over-picking the bush, that is picking unripe berries or damaging the bush.

In FIG. 2, a pair of additional blowers 161 and 163 can be seen mounted on each side of the harvesting machine. Blowers 161 and 163 are similar to blower 160; however, they are substantially smaller in size. Output ducts 162 and 164 direct the air into a duct (not shown) below conveyors 27.

As the blueberries fall on catcher pans 23 (FIG. 3) they roll off into conveyor belts 27 on each side of the machine. The conveyor belt is made up of spaced plastic compartments 165 which have a plurality of apertures in the bottom. The conveyor belts are available from Intralox, Inc., Harahan, La.

A portion of the air supplied by blower 160 is allowed to blow up through the bottom of the conveyor belt at location 167 (FIG. 2). This air provides an initial cleaning for the berries removing leaves, twigs and other debris that might have fallen on conveyors 27. The conveyor then proceeds to station 169 where air from blowers 161 and 163 provide a second cleaning of the berries. Prior to the position where the conveyor turns and dumps the fruit into boxes 29, a third cleaning station 171 is provided. The three separate cleaning stations thoroughly remove all foreign material from the berries enabling the berries to be washed and packaged or quick frozen without further cleaning and handling, substantially reducing the amount of labor involved in handling and cleaning the picked berries.

Though the invention has been described with respect to a specific preferred embodiment thereof, many variations and modifications will become apparent to those skilled in the art. It is therefore the intention that the appended claims be interpreted as broadly as possible in view of the prior art to include all such variations and modifications.

The embodiments of the invention in which an exclusive property or privilege is claimed are defined as follows.

1. A straddle-type harvesting machine comprising:
   frame means having a longitudinal opening therein for straddling a row of bushes to be harvested;
   a pair of spaced platform means resiliently supported by said frame above the longitudinal opening therein;
   a picking means depending from each of said platform means into said longitudinal opening in said frame means; and
   an individual drive means for imparting vertical vibratory motion to each of said picking means, each of said drive means being mounted on each of said resiliently supported platform means.

2. A straddle-type harvesting machine as set forth in claim 1, wherein each of said platform means is supported by a pair of spaced resilient means.

3. A straddle-type harvesting machine as set forth in claim 2, wherein said resilient means are air bags.

4. A straddle-type harvesting machine as set forth in claim 1, wherein each of said picking means is freely rotatably mounted to its supporting platform means.

5. A straddle-type harvesting machine as set forth in claim 1, wherein each of said picking means is in a fixed position relative to said frame means.

6. A straddle-type harvesting machine as set forth in claim 5, wherein each of said picking means comprises an elongated axle having a plurality of spaced hubs mounted thereon; and a plurality of elongated rods supported by each of said hubs, said rods on each of said hubs being offset relative to rods on an adjacent hub.

7. A straddle-type harvesting machine as set forth in claim 6, wherein the ends of said rods on one of said picking means substantially contact the ends of said rods on the other picking means.

8. A straddle-type harvesting machine as set forth in claim 6, wherein said picking means substantially close said longitudinal opening in said frame means.

9. A straddle-type harvesting machine as set forth in claim 1, wherein each of said drive means comprises a housing mounted on each of said platform means; and
each housing contains a pair of rotatable weights, said weights being mounted to rotate in a vertical plane and in phase but in opposite directions so that the weights deliver a reciprocating movement to each of said picking means when said weights pass at the top and bottom of each rotation.

10. A straddle-type harvesting machine as set forth in claim 9, wherein the frequency and amount of reciprocating motion imparted to each of said picking means can be varied by changing the rate of rotation of said weights.

11. A straddle-type harvesting machine as set forth in claim 1, wherein said drive means can vertically vibrate out of phase with each other so that one of said picking means can be ascending while the other of said picking means is descending.

12. A straddle-type harvesting machine as set forth in claim 1, further including:
a plurality of catcher pans mounted on each side of said frame means, said catcher pans extending toward the center of said frame means and substantially closing the bottom of said frame means; and
air supply means for supplying a large volume of air under said catcher pans and up and through said catcher pans as said catcher pans are moved by a bush being straddled by said harvesting machine.

13. A straddle-type harvesting machine as set forth in claim 12, further including:
a continuous conveyor belt on each side of said frame for receiving fruit off said catcher pans and for transporting said fruit to the rear of said harvesting machine, said continuous conveyor belts having an upper fruit receiving portion and a lower return portion; and
said air supply means supplying said air for said catcher pans through the space between said upper and lower portions of said conveyor belts.

14. A straddle-type harvesting machine as set forth in claim 13, wherein each of said conveyor belts has a plurality of apertures therein and a portion of the air from said air supply means blows up through said apertures to clean debris from the picked fruit.

15. A straddle-type harvesting machine as set forth in claim 14, including a second air supply means for blowing air through said conveyor belt to remove any remaining debris from the picked fruit.

16. A crop harvesting device comprising:
a main frame means comprising an inverted U-shaped frame for straddling a row of crop bearing plants;
a vertically movable subframe supported within said main frame in the portion of said main frame which would pass over a crop bearing plant as it is being straddled;
first and second support members resiliently mounted on said vertically movable subframe;
a first and a second shaker assembly depend from said respective first and second support members on said movable subframe;
a first drive means on each of said support members for imparting a reciprocating motion to its supported shaker assembly; and
a second drive means for moving said vertically movable subframe and said supported shaker assemblies up and down relative to said main frame.

17. A crop harvesting device as set forth in claim 16, wherein each of said shaker assemblies is mounted to freely rotate as it contacts a plant.

18. A crop harvesting device as set forth in claim 16, wherein each of said shaker assemblies includes a depending shaft supporting a plurality of spaced plant contacting fingers.

19. A crop harvesting device as set forth in claim 16, wherein said first drive means comprises a housing mounted on each of said support members;
each of said housing contains a pair of rotatable weights, said weights being mounted to rotate in a vertical plane and in phase but in opposite directions so that the weights deliver a reciprocating movement to said shaker assemblies when said weights pass at the top and bottom of each rotation.

20. A crop harvesting device as set forth in claim 16, wherein the frequency and amount of reciprocating motion imparted to each shaker assembly is adjustable.

21. A crop harvesting device as set forth in claim 16, wherein the amount of vertical motion of said movable subframe can be varied by changing the speed of rotation of said weights.

22. A crop harvesting device as set forth in claim 16, wherein said resilient means for fastening said support members to said movable subframe are adjustable to set the initial position of said plant contacting fingers.

23. A crop harvesting device as set forth in claim 22, wherein said resilient means are air bags, the pressure of which can be adjusted to set the initial position of said plant contacting fingers.

24. A crop harvesting device as set forth in claim 16, further including:
a plurality of catcher pans mounted on each side of said frame means, said catcher pans extending toward the center of said frame means and substantially closing the bottom of said frame means; and
air supply means for supplying a large volume of air under said catcher pans and up and through said catcher pans as said catcher pans are moved by a bush being straddled by said harvesting machine.

25. A crop harvesting machine as set forth in claim 16, further including:
a continuous conveyor belt on each side of said frame for receiving fruit off said catcher pans and for transporting said fruit to the rear of said harvesting machine; and
said air supply means supplies the air from at least one duct within said conveyor belts under said catcher pans.

26. A crop harvesting machine as set forth in claim 16, wherein each of said conveyor belts has a plurality of apertures therein and a portion of the air from said air supply means blows up through said apertures to clean debris from the picked fruit.

27. A crop harvesting machine as set forth in claim 26, including a second air supply means for blowing air through said conveyor belt to remove any remaining debris from the picked fruit.

28. A blueberry harvesting machine comprising:

a first frame for straddling a row of blueberry bushes;

a second frame pivotally supported by said first frame;

a pair of spaced vibrating members including a plurality of spaced bush contacting fingers supported by said second frame; and means for moving said second frame and said spaced vibrating members up and down relative to a blueberry bush to be harvested to enable said spaced vibrating members to move from branch to branch of said bush to pick blueberries.

29. A straddle-type harvesting machine comprising:

a substantially inverted U-shaped frame having a first and a second side and a longitudinal opening therein for straddling a row of bushes to be harvested;

a pair of freely rotatable picking assemblies depending into said longitudinal opening in said frame;

a support for each of said picking assemblies, each of said picking assemblies being resiliently mounted on said frame;

a plurality of movable catcher pans mounted on said first and said second sides of said frame, said catcher pans extending toward the center of said frame substantially closing the bottom of said longitudinal opening in said frame;

a first source of air for supplying a large volume of air below and up through said catcher pans;

a conveyor belt on each side of said frame for receiving picked fruit off said catcher pans and for conveying said fruit to the rear of said harvesting machine.

30. A straddle-type harvesting machine as set forth in claim 29, wherein each of said conveyor belts have a plurality of apertures therein and air from said first source of air blows through said apertures to clean said picked fruit of debris.

31. A straddle-type harvesting machine as set forth in claim 29, including a second source of air on each side of said frame for blowing air through said apertures in said conveyor belts to clean said fruit of any debris.

32. A straddle-type harvesting machine as set forth in claim 31, wherein air from said second source of air is blown through said conveyor belts at a plurality of cleaning stations along the path of travel of said conveyor belts.

33. A harvesting machine comprising:

a frame for straddling a plant to be harvested;

a pair of spaced, resiliently mounted shaker assemblies depending from said, frame on either side of the area to be occupied by said plant;

means for individually causing said shaker assemblies to reciprocate vertically;

means for catching the picked produce;

continuous conveyor means for receiving said produce from said catching means, said conveyor means having a plurality of apertures therein;

first air source means for supplying a large volume of air under and up through said catching means to assist in gathering the picked produce and through said conveyor means for cleaning said produce, and secondary air source means on each side of said harvesting machine for further cleaning said produce.

34. The method of harvesting produce with a straddle-type harvesting machine comprising the following steps:

providing a harvesting machine comprising:

a frame for straddling a plant to be harvested;

a pair of spaced, resiliently mounted shaker assemblies depending from said frame on either side of the area to be occupied by said plant;

means for individually causing said shaker assemblies to reciprocate vertically;

means for catching the picked produce;

continuous conveyor means for receiving said produce from said catching means, said conveyor means having a plurality of apertures therein;

first air source means for supplying a large volume of air under and up through said catching means to assist in gathering the picked produce and through said conveyor means for cleaning said produce, and secondary air source means on each side of said harvesting machine for further cleaning said produce;

moving said harvesting machine over a plant to be harvested; and harvesting said produce from said plant.

* * * * *